(12) United States Patent  
Tukker et al.

(10) Patent No.: US 7,359,294 B2  
(45) Date of Patent: Apr. 15, 2008

(54) OPTICAL SCANNING DEVICE WITH TILT DETECTION

(75) Inventors: Teunis Willem Tukker, Eindhoven (NL); Ole Klembt Andersen, Eindhoven (NL)

(73) Assignee: Koninklijke Philips Electronics N. V., Eindhoven (NL)

( * ) Notice: Subject to any disclaimer, the term of this patent is extended or adjusted under 35 U.S.C. 154(b) by 87 days.

(21) Appl. No.: 10/531,014

(22) PCT Filed: Sep. 15, 2003

(86) PCT No.: PCT/IB03/04023

§ 371 (c)(1),  
(2), (4) Date: Apr. 12, 2005

(87) PCT Pub. No.: WO2004/036557

PCT Pub. Date: Apr. 29, 2004

(65) Prior Publication Data

US 2005/0286389 A1 Dec. 29, 2005

(30) Foreign Application Priority Data

Oct. 17, 2002 (EP) ............................... 02079357

(51) Int. Cl.  
*G11B 7/00* (2006.01)

(52) U.S. Cl. .................. 369/44.32; 369/53.19; 369/112.26

(58) Field of Classification Search ............. None  
See application file for complete search history.

(56) References Cited

U.S. PATENT DOCUMENTS

| 4,219,704 | A | | 8/1980 | Russell | |
|---|---|---|---|---|---|
| 5,198,916 | A | | 3/1993 | Kim | |
| 5,216,649 | A | * | 6/1993 | Koike et al. | 369/44.23 |
| 6,487,163 | B1 | * | 11/2002 | Sugaya et al. | 369/275.4 |
| 6,545,958 | B1 | * | 4/2003 | Hirai et al. | 369/44.32 |
| 2001/0014069 | A1 | * | 8/2001 | Vrehen | 369/53.28 |

FOREIGN PATENT DOCUMENTS

| EP | 0357323 A | 3/1990 |
|---|---|---|
| EP | 0357323 B1 | 3/1990 |
| JP | 05006562 A | 1/1993 |
| JP | 05006562 B2 | 1/1993 |
| JP | 05006562 U | 1/1993 |
| JP | 200076678 A | 3/2000 |

* cited by examiner

*Primary Examiner*—William Korzuch  
*Assistant Examiner*—Christopher Lamb

(57) ABSTRACT

This invention relates to an optical scanning device for scanning an optical record carrier and detecting a tilt characteristic of the optical record carrier during scanning. The device includes a redirecting structure (26) arranged on an objective lens (10) to redirect a part of a radiation beam, when travelling towards the record carrier, differently to a main part of the radiation beam. The redirected beam part follows a path which is different to that of a path followed by the main beam part, towards a position sensitive detector in a detection system (16).

13 Claims, 3 Drawing Sheets

OPTICAL SCANNING DEVICE WITH TILT DETECTION

This invention relates to an optical scanning device with a tilt detection function.

In advanced optical scanning devices, such as Digital Versatile Disk (DVD) type systems, a high numerical aperture (NA) objective lens is used to achieve high data capacities. A drawback is the small disk tilt margin due to the wavefront aberrations, in particular coma, introduced by the cover layer of the disk when the disk is tilted. Since the wavefront aberrations increase with the NA of the objective lens, disk tilt becomes more and more important when higher numerical apertures are used.

U.S. Pat. No. 4,219,704 describes an optical scanning apparatus in which the tilt of the optical record carrier is measured. In one embodiment, the tilt is measured by means of a separate light source with for example a different wavelength. In an alternative embodiment, tilt is measured by using radiation that is emitted from the back of a laser radiation source and is consequently separated from the read-out beam. Using a laser diode with back side emission is relatively complex and costly.

Japanese Patent Application No. JP-A-200076678 describes an optical scanning device in which the front face of the object lens is formed of first and second regions of mutually different curvatures. The central region, instead of focusing the radiation beam to a spot on the information layer in the disk, focuses the central part of the beam onto the front face of the disk. In the return beam path, a holographic element is used to split the central portion of the return beam to a positional detector. The use of a holographic element to separate the two beams is a relatively costly solution.

Japanese Patent Application No. JP-A-05006562 describes an optical scanning device including a tilt detecting system. The objective lens of the device includes a peripheral edge through which the beam passes without redirection, when travelling towards the optical record carrier. A half-mirror beam-splitter, acting only at the peripheral edge or edges at which the tilt detection part of the beam is present, reflects the return tilt detection part of the beam out of the main optical path towards a tilt detection optical system, which includes a position sensor. A separate optical path is required for the tilt detection system. Furthermore, integrating the half-mirror with the actuator, as suggested in this arrangement, increases the weight of the objective lens system and increases the power consumption of the mechanical actuator system for the objective lens system. It also reduces the bandwidth of the actuator, which limits the scanning speed of the system.

It would be desirable to detect characteristics of tilt in the system without the drawbacks of the prior art arrangements.

In accordance with the present invention, there is provided an optical scanning device for scanning an optical record carrier using a radiation beam, said device comprising an optical system for focusing the radiation beam to a spot on an information layer in the record carrier, and a detection system comprising an information signal detector arranged to receive radiation from a main part of a radiation beam after reflection of the main part at the record carrier and to detect an information signal therein, wherein the optical system comprises a redirecting structure arranged to redirect a part of a radiation beam, when travelling towards the record carrier, differently to a main part of the radiation beam, such that the redirected beam part follows a path which is different to that of a path followed by the main beam part, and wherein the detection system comprises a position sensitive detector for detecting a position of the redirected beam part.

By use of the present invention, a tilt detection system is provided which does not require a separate tilt detecting branch in the optical system. The redirecting structure can for example be formed on a surface of an objective lens in the optical system and redirect a part of the main information signal detecting beam. After reflection from the optical record carrier, the redirected part may follow a path passing through the same optical components as the main beam, until the position sensitive detector is reached.

Further aspects, advantages and features of the present invention will become apparent from the following description of preferred embodiments of the invention, given by way of example, made with reference to the accompanying drawing, wherein.

Figure 1:
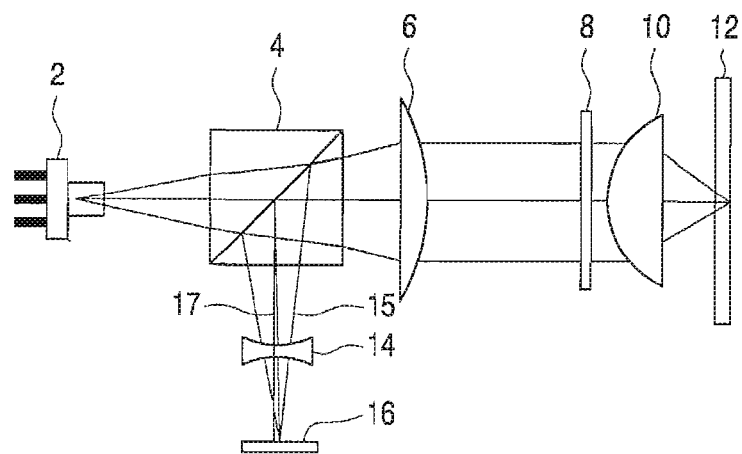
FIG. 1 is a schematic side view of an optical scanning device in accordance with an embodiment of the invention.

An optical scanning device in accordance with an embodiment of the invention is shown in FIG. 1. In this embodiment, the device is adapted for scanning DVD-type disks. A radiation source 2, in this embodiment a laser diode, emits a radiation beam with a predetermined wavelength, for example 660 nm. The radiation beam is collimated by a collimator lens 6 and is focused on an information layer of the optical record carrier, in this embodiment a disk, by an objective lens with a predetermined focal length, for example 2.75 mm. A quarter wave plate 8 and a polarizing beam splitter 4 are used to direct the reflected beam onto a detection system 16. A detector lens 14, such as an astigmatic lens, is used to provide focus control for the main beam part 15.

In addition to the main beam which passes through the optical system as described above, a beam part 17 is separated out in the optical path for tilt detection purposes, and redirected towards a tilt detecting part of the detection system 16 to be detected separately from the main information signal. The redirected beam part 17, after being redirected on its way to the record carrier 12 and reflection thereby, passes through each of the objective lens 10, the quarter wave plate 8, the collimator lens 6 and the detector lens 14, each within the respective apertures thereof. The collimator lens 6 focuses the redirected beam part 17 to a spot on a position sensitive detector in the detection system.

Figure 2:
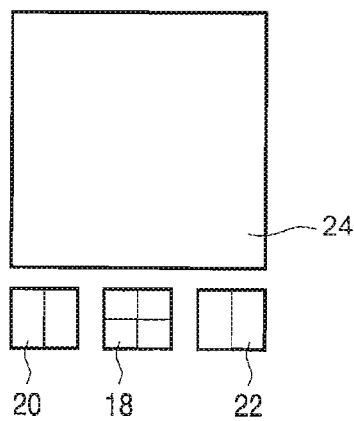
FIG. 2 is a plan view of a detection system arranged in accordance with an embodiment of the present invention.

FIG. 2 illustrates an exemplary detector array used in the detection system 16. The detector array includes a conventional quadrant detector 18 for detecting the information signal read from an information layer in the optical disk 12 and a focus error signal, and two push-pull radial tracking error detectors 20, 22 arranged to each side of the quadrant detector 18, for detecting a tracking error signal. Also included in the detection system 16 is a two dimensional position sensing device 24, used for detecting both radial disk tilt and tangential disk tilt. In alternative embodiments, a one dimensional position sensing device may be used in place of the two dimensional position sensing device 24, to detect either a radial tilt or a tangential tilt alone. Further alternatively, two one dimensional detectors may be used, along with two sets of redirecting structures, as will be described below, in order to separately detect both the radial disk tilt and the tangential disk tilt.

Figure 3:
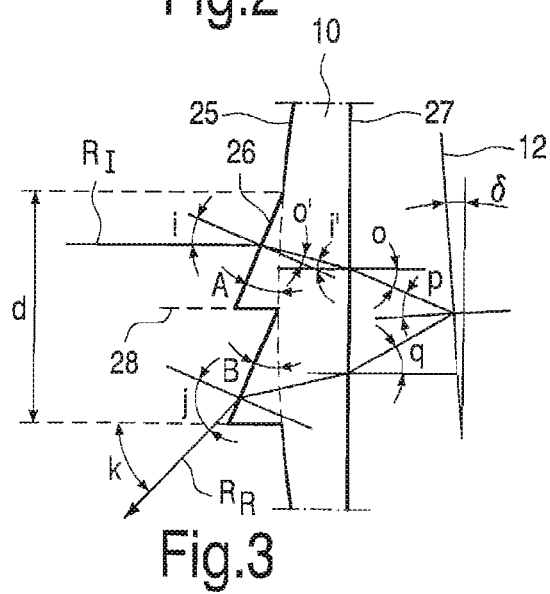
FIG. 3 is a schematic cross-sectional view of an objective lens arranged in relation to a disk in accordance with an embodiment of the invention.
Figure 4:
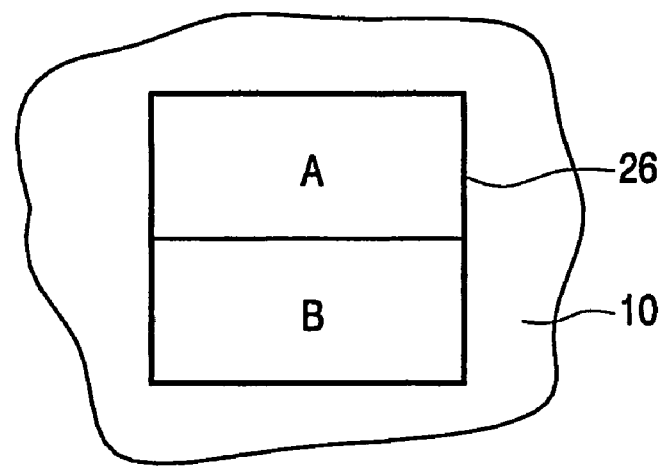
FIG. 4 is a plan view of a part of the surface of the objective lens shown in FIG. 3.

In this embodiment, a redirecting structure 26 is provided on the front surface 25 of the objective lens 10, i.e. the surface closest to the radiation source 2, as shown in FIGS. 3 and 4. This structure can be located at any location of the lens, both inside and outside the aperture used for scanning the information layer of the disk 12. The preferred location is in the center of the lens 10, as shown in FIG. 3, since at this location the redirected beam part will measure the disk tilt at the main scanning spot location. In this embodiment, the back surface 27 of the objective is planar.

The redirecting structure 26 includes two oblique and flat areas A and B, each of which is inclined with respect to the surrounding lens surface, as is indicated in FIGS. 3 and 4. In this embodiment, both areas are inclined at an angle i. In an alternative embodiment, the surfaces are inclined at different angles. In a further alternative embodiment, the surface B is not included; the return beam part may instead pass through a substantially flat part of the objective front surface 25. A collimated beam part, represented by ray $R_I$, incident on area A, is redirected, when travelling parallel to the optical axis 28 of the lens 10, by the oblique surface A and reflected by the disk, following which the beam part is again redirected by oblique surface B, as represented by ray $R_R$. The disk has a tilt δ relative to plane equivalent in orientation to the detector surface. The rays make the angles i, o', i', o, p, q, j and k as they are redirected and reflected as shown in FIG. 3. The angle k relative to the optical axis 28 of the reflected ray $R_R$ is as follows:

$$k=2((n-1)i+\delta) \quad (1)$$

In the above, small angle approximations are used and n is the refractive index of the body of the objective lens 10. The position x of the spot focused by a collimator in the detector plane when the angle δ is measured in the direction equivalent to that in which x is measured is:

$$x=fk=2f[(n-1)i+\delta] \quad (2)$$

where f is the focal length of the collimator and servo lens combination. Thus the non-tilt position of the reflected spot can be selected by appropriately selecting the tilt angle i of the oblique flat areas A and B, and is varied in dependence on the disk tilt δ. The center of the position detector 26 is spaced from the center of the quadrant detector 18 in the detector plane by a value of approximately 2f(n−1)i. The only alignment required during manufacture is in the orientation of the objective lens 10 such that the oblique areas A and B are arranged with respect to the position detector so that the spot of the redirected beam part 17 falls in the center of the detector 24 when an untilted disk portion is being scanned.

Note that the angles shown in FIG. 3 are schematic, and are exaggerated for illustrative purposes. The angle k which the redirected and reflected beam part 17 makes with the optical axis in the collimated part of the beam should be small enough, generally in the region 0<i<10°, such that the redirected beam part 17 passes through each of the components shown in FIG. 1 and is redirected with respect to the main beam part. The angles should be sufficient to separate the redirected beam part and the main beam part onto the respective different detector elements of the detection system 16. The radiation that is incident on the oblique area A is reflected back to the detector with an angle γ and its position along an axis on the detector surface is x. Taking as an example the refractive index n=1.768 for the body of the objective lens 10, i=54.3 mrad, and a focal length of 12 mm for the collimator and the detector lens combination the x position is given by:

$$x=24(0.768\times0.0543+\delta)\approx1.00+24\delta \text{ mm} \quad (3)$$

Assuming a maximum disk tilt of δ=±2°(=±35 mrad) the minimum and maximum x positions are 0.16 mm and 1.84 mm. The shift can be measured with a positive sensitive detector in the detection system such as a Hamamatsu S7848 detector. With a typical position error of say 30 μm, to tilt angle measurement accuracy of less than ±0.1° can be achieved.

Preferably, the redirecting structure 26 forms less than 5% of the cross-sectional area of the main beam part aperture. In this example, the Anteryon AO460 objective lens type is used as the basis for the objective lens 10. The total area of the pupil of the objective lens is 10.07 mm². The area of the center structure is for example 0.25 mm², so 2.5%, i.e. less than 5%, of the scanning radiation beam is not focused to a spot on the information layer of the disk 12, but is used for disk tilt measurement. This affects the shape of the main beam spot, but within acceptable tolerances.

Figure 5:
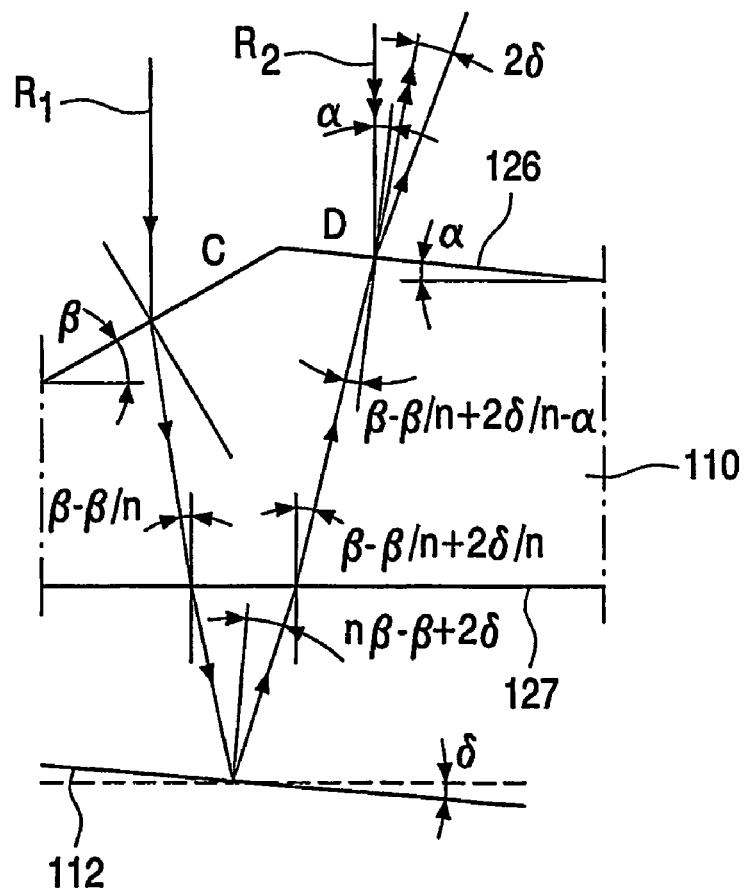
FIG. 5 is a schematic cross-sectional view of an objective lens arranged in relation to an optical disk in a further embodiment of the invention.
Figure 6:
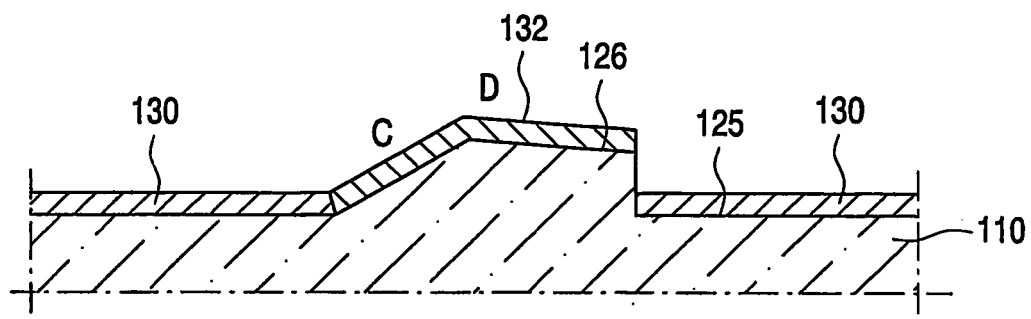
FIG. 6 is a cross-sectional view of a portion of the objective lens shown in FIG. 5.

A further embodiment of the invention is shown in FIGS. 5 and 6, in which elements similar to the first embodiment are given the same reference numerals, except incremented by 100.

In this embodiment, an alternative redirecting structure 126 is used which consists of two small inclined planar surfaces C and D, which are inclined at angles of α and β with respect to the planar back surface 127 of the lens, which is a plane perpendicular to the optical axis of the lens. One incident beam part, represented by $R_1$, is redirected and reflects at the disk and another incident beam part, represented by ray $R_2$, reflects at the lens surface. The angles α and β are preferably selected such that when the object lens and the disk are parallel the redirected and reflected rays $R_1$, $R_2$ overlap. This condition is as follows:

$$\beta = \alpha \frac{(n+1)}{(n-1)} \quad (4)$$

Where small angle approximations are used and n is the refractive index of the objective lens 110 for the radiation passing through the lens. When the objective and disk are tilted with the same angle, the beam parts represented by rays $R_1$ and $R_2$ overlap when travelling towards the detector, independent of the absolute tilt angles, providing these remain small. Taking for example α=1.4° and n=1.5 gives β=7.0°. In FIG. 5 the disk makes an angle δ with respect to a plane equivalent to the detector plane. Taking small angle approximations, the angle between the beam part reflected at the objective lens surface, represented by ray $R_2$, and the beam part redirected and reflected at the disk, represented by ray $R_1$ is 2δ.

The position signals of the two beam parts represented by rays $R_1$ and $R_2$ at the detector 24 are discriminated in the signal processing system associated with the detection system. In one embodiment, discrimination is provided by modulating the redirected beam part represented by ray $R_1$ by placing a radiation intensity modulator between the disk and objective lens. Then by demodulation, the detector signals can be discriminated. Alternatively, a different source, for example of a different wavelength, such as the additional CD laser which is available in CD-compatible DVD players, may be used to produce a radiation beam from which the reflected beam part is produced. This source can be switched on and off independently of the main beam source, and its contribution to the detector signals can thus be discriminated.

FIG. 6 shows the use of an anti-reflection coating 130 on the remainder of the objective lens surface 125 and a high-reflection coating 132 on the redirecting structure which are needed to separate the rays. The anti-reflection coating 130 is highly-transmissive to both the CD wavelength (e.g. 780 nm) and the DVD wavelength (e.g. 660 nm), whilst the high-reflection coating 132 is highly transmissive to the DVD wavelength and highly reflective to the CD wavelength. The radiation beam from which the beam part represented by ray $R_1$ is formed is emitted by the DVD laser and the radiation beam from which the beam part represented by ray $R_2$ is formed is emitted by the CD laser. When the CD laser is switched off the signals from the detector correspond with the DVD beam part which is redirected and undergoes reflection at the disk 112. After switching the CD laser on, the second detector signals corresponding with both the beam parts undergoing reflection at the disk and objective lens respectively. Subtracting the detector signals obtained in the first measurement yields the signals generated by the CD laser beam part. Thus, both the DVD laser spot and CD laser spot positions on the detector 24 can be calculated, corresponding with the disk tilt and objective tilt respectively. By intermittent switching of the CD laser, the respective tilts can be measured dynamically.

Alternatively, a similar discrimination effect can be achieved vice-versa, by using a high-reflection coating 132 which is highly transmissive to the CD wavelength and highly reflective to the DVD wavelength and again intermittently switching the CD laser on and off.

The sensitivity of the tilt angle measurement in this embodiment is the same as in the first embodiment, namely a disk tilt of ±2° can be measured with an accuracy of 0.07.

An advantage of the present invention is that it can be incorporated in a three dimensional mechanical actuator that controls the tilt of the objective lens. In the first embodiment, shown in FIGS. 3 and 4, the tilt of the objective lens 10 at different driving signals of the mechanical actuator can be calibrated and an appropriate driving signal to the detected disk can be used to compensate the disk tilt dynamically.

Figure 7:
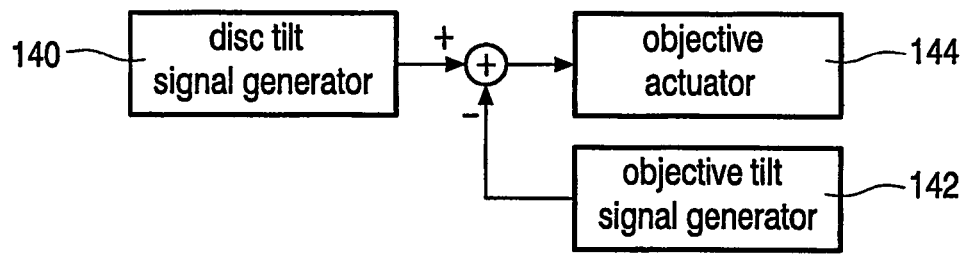
FIG. 7 is a schematic view of signal processing elements used in an embodiment of the invention.

In the second embodiment, shown in FIGS. 5 and 6, the tilt of the disk can be compensated using a servo loop as schematically illustrated in FIG. 7. Once the disk tilt signals and the objective tilt signals have been generated in the signal processing system, as represented schematically by the disk tilt signal generator 140 and the objective tilt signal generator 142, the two signals can be subtracted to derive an objective actuator control signal, which is used to control the objective actuator 144. In this way, the objective tilt can be made approximately equal to the disk tilt. Absolute objective tilt control signals are not necessary.

Figure 8:
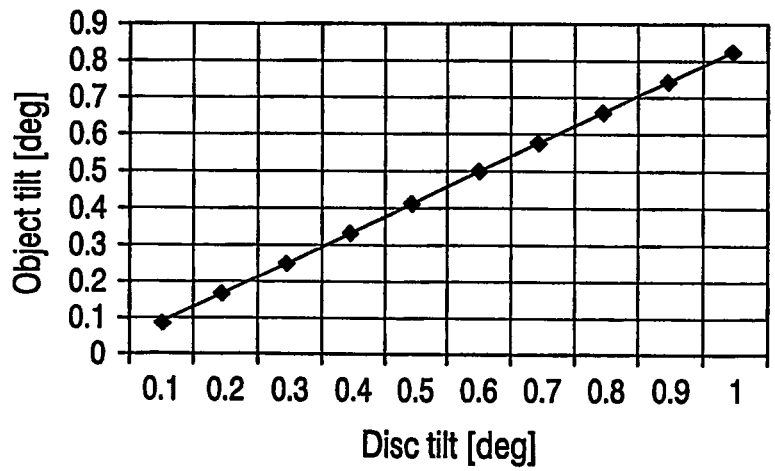
FIG. 8 is a graph showing a relationship between disk tilt and an optimum objective tilt used in an embodiment of the invention.

FIG. 8 shows the optimum compensating objective tilt as function of the disk tilt. The function is substantially linear with a slope of slightly less than 1. The corresponding root mean square (RMS) aberrations have been calculated and are listed in Table 1 below. Approximating the slope to 1, e.g. assuming the disk tilt and objective tilt are equal, as in the last column, results not in the optimum tilt compensation but still the RMS aberration is reduced substantial and is roughly 25% higher than in the optimum case. Assuming a manufactured objective lens with a RMS aberration of 30 m, the maximum allowable disk tilt in this example is ±1°, since the maximum allowable wavefront aberration is say 70 mλ, which corresponds to the total RMS taking the objective aberrations and the aberrations due to 1° disk tilt, with disk tilt ($tilt_{disk}$) being compensated by equal objective lens tilt ($tilt_{obj.}$), as shown in the last column of Table 1.

TABLE 1

| Disc tilt [°] | Obj. tilt [°] | RMS without compensation [mλ] | RMS with optimum compensation [mλ] | RMS with $tilt_{disk} = tilt_{obj.}$ compensation [mλ] |
|---|---|---|---|---|
| 0.1 | 0.085 | 13.6 | 3.75 | 4.57 |
| 0.2 | 0.17 | 27.2 | 7.54 | 9.23 |
| 0.3 | 0.25 | 40.9 | 11.4 | 14.1 |
| 0.4 | 0.33 | 54.4 | 15.5 | 19.3 |
| 0.5 | 0.42 | 68.1 | 19.8 | 24.8 |
| 0.6 | 0.50 | 81.7 | 24.3 | 30.8 |
| 0.7 | 0.58 | 95.3 | 29.1 | 37.3 |
| 0.8 | 0.66 | 108 | 34.2 | 44.4 |
| 0.9 | 0.75 | 123 | 39.7 | 52.1 |
| 1.0 | 0.83. | 136 | 45.5 | 60.5 |

In the embodiments described above, the oblique areas A, B; C, D are at the front surface of the objective lens 10. Alternatively, they can also be located at the back surface or on a different surface of the objective lens system. In any chosen arrangement, the redirected part of the beam should not be focussed on a surface of the record carrier, unlike the main beam which is focussed on an information surface of the disk. The surface carrying the structure, besides the oblique areas A and B, does not necessary to be perpendicular to the optical axis. However, it is preferably planar and if other orientations are selected the angles of orientation described above will be different.

Whilst in the above embodiment the optical scanning device is a DVD device, it should be understood that the invention can be used in all optical disk drives where disk tilt is a problematic feature. Furthermore, whilst in the second embodiment the second source is the CD laser source, other types of second radiation sources may be used.

In the above second embodiment, a single detector is used to detect the both the redirected and reflected parts of the beam; alternatively two separate position sensitive detectors may be used to detect each part separately, and the two parts may be separated respectively by arranging the inclinations of the redirecting structure portions appropriately.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. An optical scanning device for scanning an optical record carrier by means of a radiation beam, said optical scanning device comprising:
    an optical system for directing said radiation beam to an information layer of the optical record carrier, said optical system comprising means for focusing at least a main part of said radiation beam to a spot on said information layer, and a redirecting structure for redirecting a second part of said radiation beam other than said main part along a path to said information layer different from a path of said main part of said radiation beam, said optical system further receiving and directing a reflected radiation beam, reflected from said information layer, inclusive of a reflected main part corresponding to said main part of said radiation beam and a reflected second part corresponding to said second part of said radiation beam; and
    a detection system including an information signal detector for receiving said reflected main part from said optical system for detecting an information signal therein, and a position sensitive detector collocated with said information signal detector for receiving said reflected second part from said optical system, said position sensitive detector detecting a position of the reflected second part of the reflected radiation beam,
    wherein the redirecting structure comprises a first portion for redirecting the second part of the radiation beam when traveling towards the record carrier, and a second portion for redirecting the reflected second part of the reflected radiation beam after reflection from the record carrier,
    wherein the optical system comprises a reflective portion for reflecting a part of the radiation beam such that the reflected beam part follows a path which is different to a path followed by the main part of the radiation beam,
    and wherein the position sensitive detector detects a position of the reflected beam part.

2. The optical scanning device as claimed in claim 1, wherein said redirecting structure comprises a refractive redirecting portion.

3. The optical scanning device as claimed in claim 2, wherein the redirecting structure comprises a substantially flat surface portion.

4. The optical scanning device as claimed in claim 1, wherein the redirecting structure is formed as part of an objective lens system in the optical system.

5. The optical scanning device as claimed in claim 1, wherein the redirecting structure is formed on a surface of a lens element.

6. The optical scanning device as claimed in claim 5, wherein the redirecting structure is a non-rotationally symmetric variation in a surface of the lens element.

7. The optical scanning device as claimed in claim 5 or 6, wherein the redirecting structure comprises a surface portion which is inclined with respect to a surrounding lens surface of the lens element.

8. The optical scanning device as claimed in claim 1, wherein the redirecting structure covers less than 5% of a cross-sectional area of a radiation beam.

9. The optical scanning device as claimed in claim 1, wherein said second portion of the redirecting structure and said reflective portion are formed as a single structural element.

10. The optical scanning device as claimed in claim 9, wherein inclinations $\alpha$ and $\beta$ of said first and second portions, respectively, of the redirecting structure are as follows:

$$\beta = \alpha \frac{(n+1)}{(n-1)}$$

where n is a refractive index of the redirecting structure.

11. The optical scanning device as claimed in claim 1, wherein the detection system comprises a single position sensitive detector for detecting both the redirected reflected second part and the reflected beam part.

12. The optical scanning device as claimed in claim 1, wherein said optical scanning device further comprises a first radiation source generating a first radiation beam of a first wavelength and a second radiation source generating a second radiation beam of a different second wavelength, and wherein the reflective portion is selectively reflective in relation to one of the first and second wavelengths.

13. The optical scanning device as claimed in claim 12, wherein the radiation source generating the second beam is selectively modified in intensity to vary the relative intensities of the redirected reflected second part and the reflected beam part.

* * * * *